US012602312B2

(12) United States Patent
Oruganti et al.

(10) Patent No.: US 12,602,312 B2
(45) Date of Patent: Apr. 14, 2026

(54) CONFIGURABLE IDENTIFICATION MECHANISM OF DEBUG PARAMETERS IN MULTI-PROCESS OR MULTI-THREADED DEBUGGING

(71) Applicant: ORACLE INTERNATIONAL CORPORATION, Redwood Shores, CA (US)

(72) Inventors: Satish Chandra Oruganti, Bengaluru (IN); Ganesh Kumar Gupta, Bengalore (IN); Michael P. Rodgers, Lake Oswego, OR (US)

(73) Assignee: Oracle International Corporation, Redwood Shores, CA (US)

( * ) Notice: Subject to any disclaimer, the term of this patent is extended or adjusted under 35 U.S.C. 154(b) by 125 days.

(21) Appl. No.: 18/236,735

(22) Filed: Aug. 22, 2023

(65) Prior Publication Data

US 2025/0068551 A1      Feb. 27, 2025

(51) Int. Cl.
 G06F 11/3698      (2025.01)
 G06F 11/362      (2025.01)
(52) U.S. Cl.
 CPC ........ G06F 11/3698 (2025.01); G06F 11/366 (2013.01)
(58) Field of Classification Search
 CPC .................................................... G06F 11/36
 See application file for complete search history.

(56) References Cited

U.S. PATENT DOCUMENTS

| | | | |
|---|---|---|---|
| 9,632,915 B2 | 4/2017 | Davis et al. | |
| 10,621,068 B2 | 4/2020 | Kruszewski et al. | |
| 2004/0221271 A1* | 11/2004 | Zeman | G06F 11/3698 |
| | | | 717/127 |

(Continued)

FOREIGN PATENT DOCUMENTS

| | | |
|---|---|---|
| CN | 114490338 A | 5/2022 |

OTHER PUBLICATIONS

David Millington; New IDE Plugin: Parnassus Parallel Debugger; Dec. 15, 2020; pp. 1-8; downloaded from: Https://blogs.embarcadero. com/new-ide-plugin-parnassus-parallel-debugger/.

(Continued)

*Primary Examiner* — Ziaul A Chowdhury

(74) *Attorney, Agent, or Firm* — Kraguljac Law Group LLC

(57)      ABSTRACT

Systems, methods, and other embodiments associated with a configurable identification mechanism of debug parameters are described. In one embodiment, a method includes generating a graphical user interface (GUI) for a debugging program, where the GUI is configured to provide options to configure naming rules for threads during debugging of a computer process that includes multiple threads. The options to configure the naming rules may include configuring a naming rule that adds one or more context identifiers to a thread name. The thread name may be generated by automatically populating one or more of the context identifiers with a variable value that occurs during execution of the thread that corresponds to the one or more context identi- (Continued)

fiers. A conditional breakpoint may be controlled during debugging that is thread-specific based on a condition including at least one context identifier that matches a portion of the thread name.

20 Claims, 4 Drawing Sheets

(56)                    References Cited

U.S. PATENT DOCUMENTS

| 2012/0159451 | A1* | 6/2012 | Bates | G06F 11/3698 |
| | | | | 717/125 |
| 2014/0208323 | A1* | 7/2014 | Goetz | G06F 8/31 |
| | | | | 718/100 |
| 2014/0310714 | A1* | 10/2014 | Chan | G06F 16/285 |
| | | | | 718/102 |
| 2014/0366006 | A1* | 12/2014 | Gottschlich | G06F 9/38 |
| | | | | 717/125 |
| 2018/0089061 | A1* | 3/2018 | Cook | G06F 11/323 |

OTHER PUBLICATIONS

Sampada Kathare; Easier Debugging of Multithreaded Software; Master's Projects, San Jose State Univeristy ScholarWorks; Fall 2012; pp. 1-41.
Jetbrains Rider Documentation; Debug Multithreaded Applications; Dec. 28, 2022; pp. 1-3.
microsoft.com; Debug Multithreaded Applications in Visual Studio; Apr. 30, 2022; pp. 1-3.
microsoft.com; View the Call Stack and Use the Call Stack Window in the DeBugger; Feb. 7, 2023; pp. 1-5.
microsoft.com; Debug Multiple Processes (C#, Visual Basic, C++); Apr. 30, 2022; pp. 1-8.
ibm.com; Using the Debug View; Jun. 10, 2021; pp. 1-5.
Jetbrains—IntelliJ IDEA 2022.3; Debug Code; Jan. 16, 2023; pp. 1-3; downloaded from: https://www.jetbrains.com/help/idea/debugging-code.html.
Jetbrains—IntelliJ IDEA 2022.3; Breakpoints; Jan. 24, 2023; pp. 1-7; downloaded from: https://www.jetbrains.com/help/idea/using-breakpoints.html.
Jetbrains—IntelliJ IDEA 2022.3; Customize Views; Jan. 17, 2023; pp. 1-14; downloaded from: https://www.jetbrains.com/help/idea/customizing-views.html.

* cited by examiner

Code Execution Distinguisher 120

```
1  // Test Program to debug Multiprocess
2  #include <iostream>
3
4 · int main() {
        // Write C++ code here
        std::cout << "Process 1";
        std::cout << "Process 2 as well";
        return 0;
9  }
```

130 Process A

135 Process B

FIG. 2

CONFIGURABLE IDENTIFICATION MECHANISM OF DEBUG PARAMETERS IN MULTI-PROCESS OR MULTI-THREADED DEBUGGING

BACKGROUND

A debugger is a software tool used by developers and software engineers to analyze, monitor, and troubleshoot programs during their execution. When a debugger is attached to a computer process, the debugger gains control over the process and can inspect its memory, variables, and execution flow.

In existing debugging models, it is very difficult to debug a process with multiple threads with common code execution points. There is no difference in visualization of debug parameters of multiple threads from a process, where the multiple threads are hitting the same code, using the same memory space and resources within the process. In general, the only identification point provided is a thread ID, which is typically a hexadecimal value, that is generated by an operating system. The thread ID is not readily visible and is normally hidden deep inside the details of thread. Even when the thread ID is visible, it is not useful to a human since the values assigned may look like 6C3A7 (hexadecimal).

The same problems exist when a debugger is attached to multiple processes in a native programming set up. Some of the difficulties faced by the programmer debugging the code in a multi-process/multi-thread set up include: the debugger does not visually depict which process or thread is halted at the current execution line of code; the same debug pointer is used for multiple processes or threads and hence there is a possibility of the debug pointer randomly jumping between code lines when context switching happens between the thread, which causes confusion to the developer. Furthermore, watch variables used during debugging do not show the information of the process and/or thread they are associated with, and the call stack does not clearly show which thread or process the stack is associated with.

Prior debugging models do not have mechanisms for setting process-specific or thread-specific parameters that would be advantageous to debugging an executable computer application.

SUMMARY

In one embodiment, a computing system and method is described that provides debug tool with a configurable identification mechanism for processes and/or threads. The debug tool may be configured to: generate a graphical user interface (GUI) for a debugging program, where the GUI is configured to provide options to configure naming rules for threads during debugging of a computer process that includes multiple threads. The options to configure the naming rules may include configuring a naming rule that adds one or more context identifiers to a thread name. The debug tool may provide options to define a conditional breakpoint during debugging that is thread-specific based on at least one context identifier. In response to an executing thread reaching the conditional breakpoint, the debugger is configured to: (i) stop execution of the executing thread in response to the thread name of the executing thread including the at least one context identifier; and (ii) allow continued execution of the executing thread in response to the thread name not including the at least one context identifier.

In one embodiment, the present system and method controls a conditional breakpoint during the debugging that is thread-specific based on a condition including at least one context identifier that matches a portion of the thread name. Other debug parameters may be assigned to specific threads (or processes) based on created thread names (or created process names).

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 2 illustrates another embodiment of debugging screen that shows different debug pointers in different colors.

DETAILED DESCRIPTION

Figure 1:
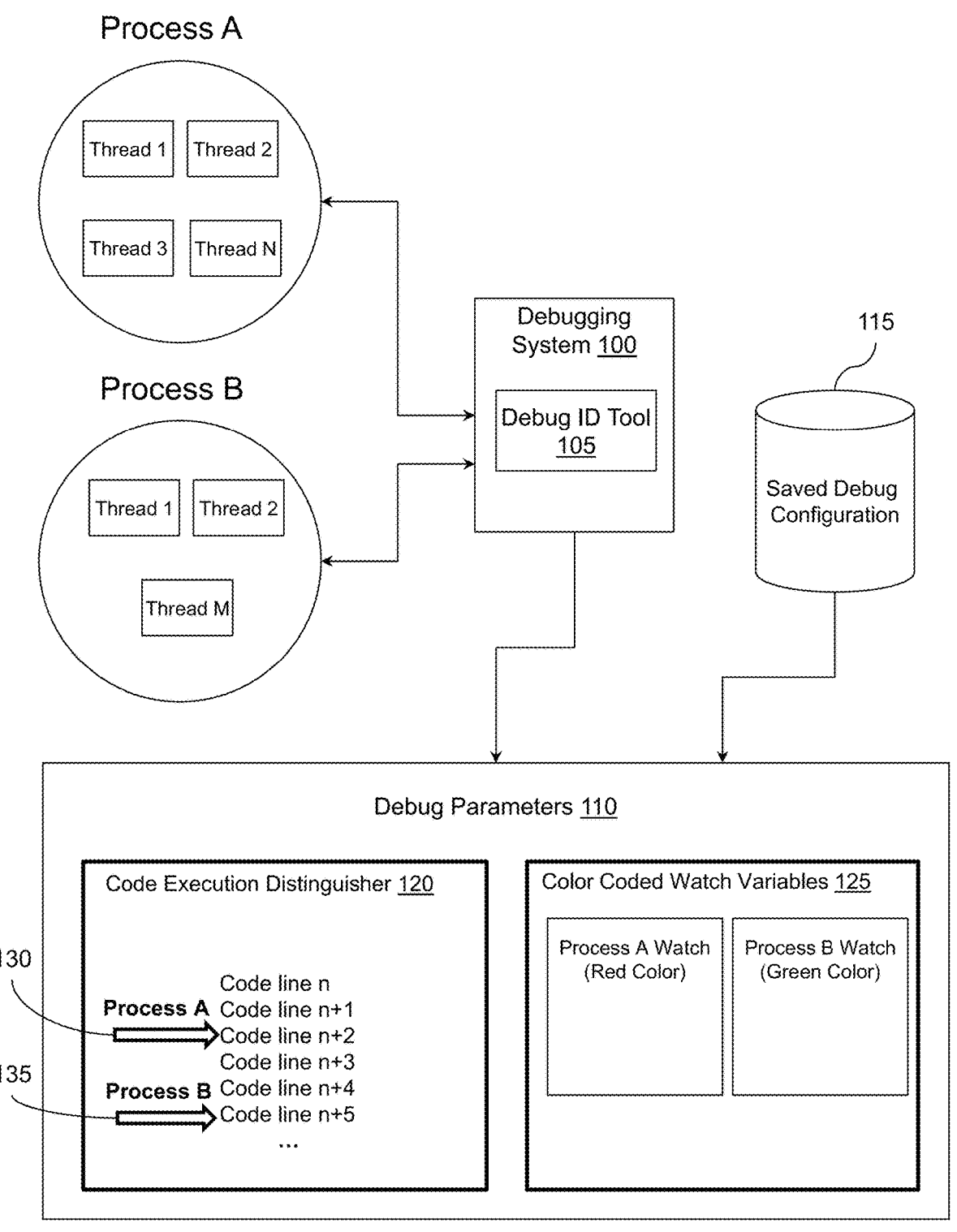
FIG. 1 illustrates one embodiment of a system associated with a debug identification system and tool for identifying processes and/or threads.

Systems and methods are described herein that are associated with a debugging tool. The debugging tool is implemented to provide a configurable identification mechanism of debug parameters in multi-process and/or multi-threaded debugging of code, for example. The present debugging tool may be implemented with a graphical user interface that allows code developers or programmers to configure and assign unique identifiers to individual processes and individual threads. This, in turn, allows specific debug parameters to be assigned or applied to specific processes and/or specific threads during a debug process, which was not possible in previously debuggers. The present system creates a visually advantageous debugging tool that is easy to use and visually distinguishes different debug parameters that can be process-specific when multiple processes are simultaneously executing and also thread-specific when multiple threads are simultaneously executing within a process.

Previous debugging techniques and tools do not provide thread-specific debug parameters or allow a debugger to apply/assign debug parameters to specific threads. This is a problem when a process executes with multiple threads because individual threads may not be identifiable or distinguishable from other threads. In general, debug parameters were previously applied to all threads during debugging because no individual thread was identified, which made it very difficult to identify and isolate any particular thread that was executing improperly or causing errors.

The present debugging tool improves upon these previous debugging techniques and tools by providing a configurable mechanism to identify and distinguish specific processes and/or specific threads as well as apply debug parameters to specific processes and/or to specific threads since these are uniquely identifiable by the present debugging tool.

For example, with the present naming identification system, various debug parameters may be assigned to specific process names or specific thread names and be distinguished from each other. Debug parameters may include, but are not limited to, 1) process or thread specific color-coded call stack and other color-coded debug parameters like watch variables, etc., 2) current code line of execution with multiple debug pointers to each process or thread, respectively, 3) thread classification and thread specific conditional breakpoints. 4) configurable user interface debug distinguishing options based on process or thread name.

In one embodiment, the present debugging tool provides the ability to assign multiple and color-coded debug pointers with clear identification of the process and/or thread that the pointer is associated with.

In one embodiment, the present debugging tool provides configurable and automatic thread naming and thread classification. For example, the debugging tool provides features to allow a user/developer to configure rules that define a thread naming convention for threads by adding one or more context-based identifiers to a thread name. Similar naming conventions may also be created to uniquely name and identify each process in a multi-process application.

In another embodiment, the present debugging tool provides rules for setting conditional breakpoints on threads. For example, based on the thread naming and/or classification features, the debugging tool provides additional flexibility and choices to enable conditional breakpoints on specified threads. This may include enabling a code breakpoint for a whole thread family or a specific thread component. In general, a breakpoint is a designated point in the code where the developer wants to stop the program's execution to inspect its state. Additional features and descriptions are provided herein with reference to the associated figures.

Overview

With reference to FIG. 1, one embodiment of a debugging system 100 is illustrated that is configured with a debug identification (ID) tool 105. The debug ID tool 105, as explained previously, is configured to provide a configurable identification mechanism of debug parameters in multi-process and/or multi-threaded debugging of code, for example. The debug ID tool 105 may be implemented with a graphical user interface that allows code developers or programmers to configure and assign unique identifiers to individual processes and individual threads as part of their name.

In general, the debugging system 100 is a software debugger used by developers and software engineers to analyze, monitor, and troubleshoot programs during their execution. When the debugging system 100 is attached to a computer process, the debugging system 100 gains control over the process and can inspect its memory, variables, and execution flow. As shown in FIG. 1, the debugging system 100 may be attached to any number of processes such as process A and process B. Each process may have one or more threads that execute.

In one embodiment, the debugging system 100 may be an Integrated Development Environment (IDE) debugger, which is a specialized tool integrated into an IDE to assist developers in debugging their software code. IDEs are comprehensive software development environments that typically include a code editor, compiler or interpreter, build tools, and various other features to facilitate software development. The debugger is a helpful component of an IDE, providing a set of tools and features that help developers identify and fix issues in their code efficiently.

In general, a computer process (e.g., process A or process B) is an independent, self-contained unit of execution in a computer system. A process includes its own memory space, code, data, and system resources. Each process operates in isolation from other processes, meaning one process cannot directly access the memory or resources of another process. Processes are managed by the operating system, which allocates resources, schedules their execution, and ensures proper communication between components.

In general, a computer thread is a smaller unit of execution within a process. A process can have multiple threads, and each thread represents a sequence of instructions that can be executed independently. Threads share the same memory space and resources within a process. This allows the threads to communicate and work together efficiently, but this also makes them difficult to distinguish.

In one embodiment, the debug ID tool 105 provides configurable options via a GUI to set debug parameters 110 that will be used during debugging. The debug parameters may be saved in a debug configuration 115 database.

In one embodiment, the debug ID tool 105 provides configurable and automatic options for thread naming and thread classification. A user/developer can configure rules for one or more naming conventions for specific threads or groups of threads by adding one or more context-based identifiers to a thread name. In one embodiment, a context identifier may be a run-time variable that is associated with or represents some execution parameter. The debug ID tool 105 is configured to automatically populate one or more of the context identifiers to create a thread name, which are based on context/variable values occurring during the run-time execution of the thread or process.

For example, a context identifier <process name> may represent the name of the process that initiates a thread. Each context-based identifier may define or represent a feature of the particular thread that not only may uniquely identify the thread, but may classify the thread as part of group of threads that all have the same value for the context identifier.

For example, when a particular thread is stopped during a debugging process, the debug ID tool 105 provides a variety of context-based identifiers that can be combined together to form a unique name for the thread. As stated previously, a thread typically is only identified by its hexadecimal thread ID, which is assigned by the operating system during execution. For example, a first thread may have a hexadecimal thread ID of 0x1A2E and a second thread may have a hexadecimal thread ID of 0x7B64. The "0x" prefix indicates that the value is in hexadecimal notation. It should be appreciated that the actual format and representation of thread IDs can vary based on the operating system and programming language of the computing system being used. As is apparent, such thread IDs are not very useful or identifiable to a human that is debugging code.

The GUI of the debug ID tool 105 allows a user to define a naming convention that assigns a desired name to the thread so that the thread is easily identified and distinguished from other threads. A thread name may include multiple context-based identifiers that are selected by a user via the GUI and combined together to form the name.

In one embodiment, the context-based identifiers may include, but are not limited to, a process name that the thread belongs to e.g., <process_name>, a module from which the thread originated e.g,. <Originate_Module_identifier>, a family name to group or classify multiple threads together e.g., <family_name>, a thread type e.g., <thread_type>, a function name of the function that started the type of thread e.g., <function_name>, a portion of the thread ID assigned by the operating system e.g., <thread_id>, and/or a custom identifier that the user selects such as a custom text string or value e.g., <custom_identifier>.

In one embodiment, each different context identifier may be selectable from an available list of context identifiers that are predefined and displayed on the GUI. Based on the above examples, but not limited thereto, the GUI may display a selectable list including: <process_name>, <Originate_Module_identifier>, <family_name>, <thread_type>, <function_name>, <thread_id>, <custom_identifier>, etc.

Additional context identifiers may also be configured by the user to create customized contexts. The final thread name may be created by concatenating or combining one or more selected context-identifiers into a string that forms a unique thread name. If a thread name included four of the example context identifiers above, the thread name would have a structure such as:

<process_name>_<function_name>_<thread_id>_ <custom_identifier>

This is one format of a naming convention that may be created and defined with the debug ID tool 105. The naming convention is not limited to the order of the context-identifiers, the type of context-identifiers used, the number of context-identifiers, or the manner of combining the context-identifiers to form a name.

As one example, suppose Process A is an application that runs multiple threads to handle different types of network requests. The debug ID tool 105 allows a user to create a naming convention to group the network-based threads together based on the type of network protocol the thread uses (e.g. HTTP, FTP, SMTP). Once the user configures the naming convention as described above, the thread name may be configured with several context identifiers such as:

<process_name>_<Originate_Module_identifier>_ <function_name>_<thread_type>_<thread_id>

Thus, the debug ID tool generates the thread name by automatically populating the context identifier values based on the run-time values and/or code. And, combining the context values as "MyApp_Net_StartFTP_OA" by automatically populating each context identifier based on its associated context/variable value that occurs during the execution of the thread or process. Of course, some context identifiers may be customized text with values that the user inputs, which are not dependent on runtime values.

In this example, "MyApp" is the process name that the thread belongs to. "Net" is a user-made identifier which refers to the module referring to a Network request. "StartFTP" is the function name from the code which starts an FTP type of thread. "OA" is a thread identifier or portion retrieved from the actual thread ID to give uniqueness to the thread name. Thus, the populated values for each context identifier may dynamically change and be different for each different thread during execution.

The naming convention may also be used for identification of a thread family. For example, all the threads originating from the same module can be grouped or classified together by adding the same context-identifier to their thread names. Thread families may then be reflected in the user interface of the debugger as well. "MyApp_Net" may be the same context-identifiers given to multiple threads to group a family of threads:

Thread 1 name=MyApp_Net_StartFTP_OA
Thread 2 name=MyApp_Net_StartSMTP_OB
Thread 5 name=MyApp_Net_StartHTTP_CD
Thread 6 name=MyApp_Net_StartHTTP_OB Thus, these four threads all come from the same process "MyApp" and originated from the same module named "Net." "StartFTP" and similar context identifiers represent the function name based on the type of network protocol they use (e.g., HTTP, FTP, SMTP), which are different for different threads. As stated previously, the characters "OA," "OB," "CD," and "OB" are portions of the thread ID added by the user in the naming convention, which may be extracted from the thread ID of the associated thread assigned by the operating system. In one embodiment, a family context identifier may also be added as a custom string such as "Family1."

Similarly, there might be threads originating from other modules in the code, such as a "database" (DB) module. These threads may be grouped together with since they have the same context identifiers "MyApp_DB":

Thread 1 name=MyApp_DB_StartInsert_OA
Thread 2 name=MyApp_DB_StartPool_OB
Thread 3 name=MyApp_DB_StartUpdate_CD
Thread 4 name=MyApp_DB_StartTrigger_OB During debugging, certain threads can be identified by searching for or identifying a particular context identifier. For example, a user can find all threads that contain the string "DB" in their thread name. In one embodiment, the debug ID tool 105 includes string parsing and/or string-matching functions to identified threads (or processes) based on a query.

In this manner, each thread is uniquely named and identified during the debugging process. By having unique names, debugging parameters may then be assigned to specific thread names and/or groups of thread names. The debugging parameters may then be displayed on a debugging screen and be visually distinguished from other threads. This makes it visually easy for the developer to look at the available threads and identify them during debugging, which drastically improves the ease of debugging. Similar naming conventions may also be created to uniquely name and identify each process in a multi-process application.

For example, with continued reference to FIG. 1 and FIG. 2, different color-coded debug pointers may be assigned to selected threads and/or to selected processes in a multi-process/multi-thread set up, based at least on the naming convention. This may include applying selected color coding to different process/thread names. Then as thread debug parameters are applied to a thread name, the same color code that was assigned to the thread name is applied to the debug parameter. Thus, different colors of debug parameters displayed on a debugging screen visually represent the associated process or thread for visual identification.

One example is shown in a debugging screen in FIG. 1 labeled as a code execution distinguisher 120. The screen shows multiple lines of code being debugged and a debugging pointer 130 for "Process A" and one pointer 135 for "Process B" that have been assigned. Although actual color is not shown in FIG. 1, one color may be assigned to the "Process A" pointer and associated debug parameters (e.g., red color) and a different color assigned to "Process B" pointer and associated debug parameters (e.g., green color).

FIG. 2 shows an example of the code execution distinguisher window 120 with color-coding. The debug pointer 130 and its name "Process A" are displayed in red color. The debug pointer 135 and its name "Process B" are displayed in green color.

Additionally, watchpoints or watch variables may be assigned based on thread name. In general, watchpoints are similar to breakpoints but are triggered when a specific memory location is read from or written to. By setting watchpoints on certain data, the developer can detect when the data is being modified unexpectedly, which aids in the detection of bugs. Thus, corresponding debug watch points or watch variables 125 (FIG. 1) may be visually displayed with the assigned color-coding corresponding to a particular process or thread.

In one embodiment, the debug ID tool 105 may be configured to display the process name or thread name over its corresponding debug pointer along with the different color-coding while debugging different processes. This is shown in the code execution distinguisher 120 screen that displays the process name "Process A" over the debug pointer 130 that is assigned to process A. This further provides visual distinctions and identification mechanisms to identify specific processes and specific threads during the debugging process creating an improved debugger tool and debugging user interface.

Figure 3:
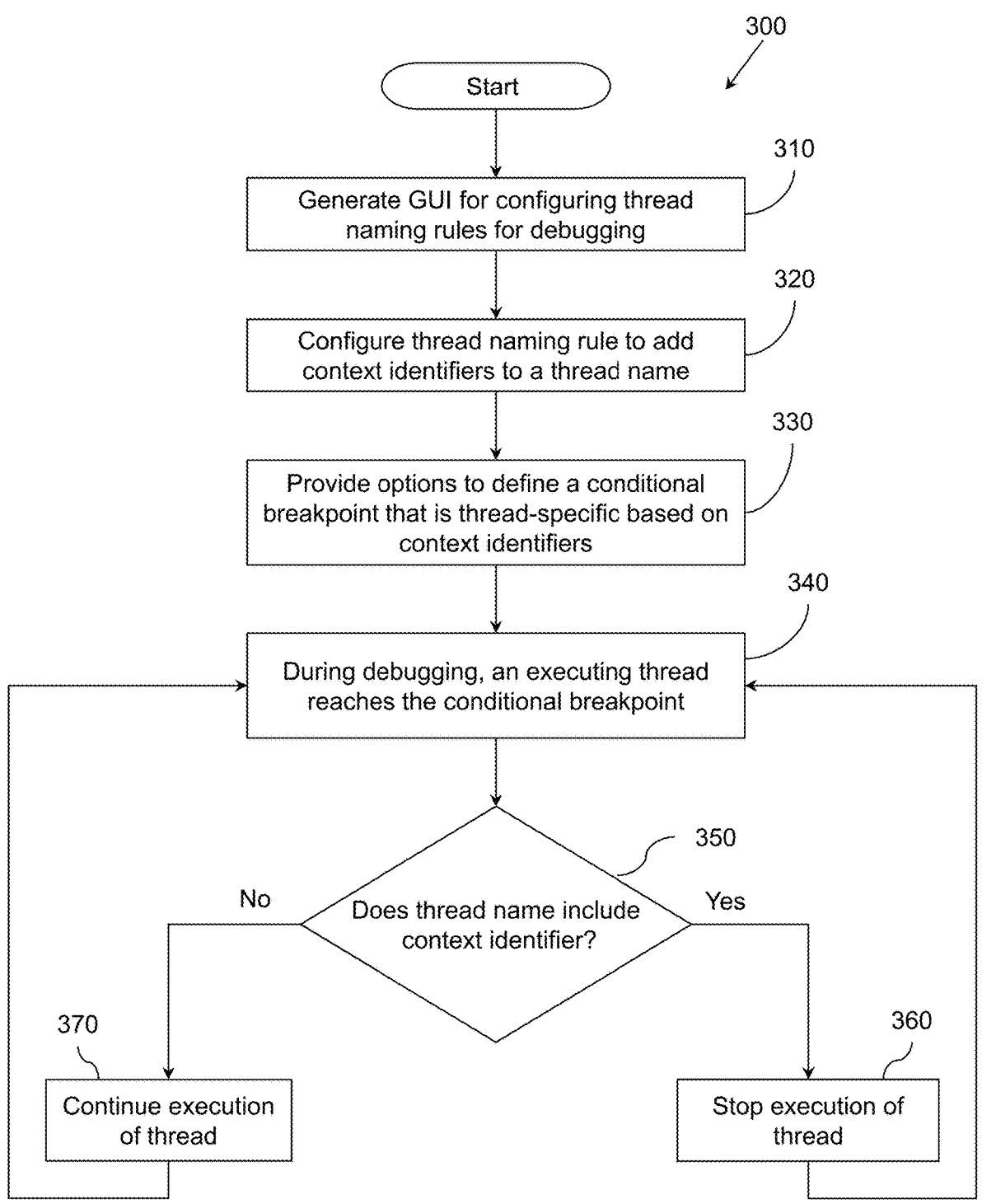
FIG. 3 illustrates one embodiment of a method associated with configuring thread naming rules for identifying threads.

With reference to FIG. 3, one embodiment of a method 300 is shown that may be associated with the debug ID tool 105. Method 300 is an implemented process for providing a configurable identification mechanism of debug parameters in multi-process and/or multi-threaded debugging systems. Method 300 may initiate, for example, during a debugging process (of a debugging program) to provide options for naming processes and/or naming threads as described above. Once names are assigned, specific debug parameters may be assigned in a process-specific and thread-specific manner. Although the following description is explained with reference to naming threads, the same or similar technique may be applied for naming processes.

In one embodiment, method 300 may initiate after the debugging system 100 is attached to an application being debugged. For example, to debug an application or process, the debugger is attached to the target application or process. This may be performed by the developer explicitly starting the application/program under the debugger's control or using specific debugging commands in the debugger's interface. Once attached, the debugger takes control of the application/process.

At block 310, a graphical user interface (GUI) is generated and displayed for the debugging program. The GUI is configured to provide options for a user to configure naming rules for threads during the debugging of a computer application and/or process, which may include multiple threads. In one embodiment, the options to configure the naming rules include configuring a naming rule that adds one or more context identifiers to a thread name (or process name).

In one embodiment, in response to the first time a thread is stopped at a breakpoint during debugging (e.g., a first thread), the GUI for thread naming may be displayed. The GUI then allows the user to assign a unique thread name to the thread as described previously or below. The unique thread name may be assigned as a custom name and/or based on a defined naming convention that will automatically populate context identifiers used in the naming convention.

Once a thread name is assigned, debug parameters may be assigned to the thread name. This then allows the debugging system to visually identity thread debug parameters that are associated with the thread based on the unique thread name of the thread. This may be repeated for each thread that stops for the first time at any breakpoint. Thus, subsequent thread debug parameters assigned to each thread name can easily be identified based on the thread name given.

At block 320, in one embodiment as described above, the debug ID tool 105 may provide options for a user to configure a thread naming convention(s), which may be regarded as a rule(s) for naming threads. The GUI of the debug ID tool 105 allows a user to define a naming convention that assigns a desired name to the thread so that the thread is easily identified and distinguished from other threads. The naming convention may include one or more context-based identifiers as described previously. For example, the thread name of a given thread may be configured as a string of one or more context identifiers including context_identifer_1 to context_identifier_N that form a unique thread name when combined together.

In one embodiment, each different context identifier may be selected from an available list of context identifiers that are predefined and displayed on the GUI. For example, a user may create a naming convention that names threads with three context IDs:

Thread
name=<context_ID1><context_ID2><context_ID3>

Custom context identifiers may also be defined by the user during the debug process with any type of text or values. In general, each context identifier is based on, and adds, context related information of the executing thread into the thread name. The assigned thread name with the selected one or more context identifiers creates a unique thread name.

For example, as previously described, the context identifiers may include one or more different identifiers such as a process name that the thread belongs to, a module name from which the thread originated, a family name to group or classify multiple threads together, a thread type, a function name of the function that started the type of thread, portions of the assigned thread ID, and/or a custom identifier that the user creates.

In one embodiment, the debugging system 100 and the debug ID tool 105 are executed by a computing system that includes an operating system. The operating system maintains information about active threads in each executing process. Each thread is assigned a unique identifier or thread ID by the operating system, which may be a hexadecimal value. When the debugging system 100 attaches to a process, the debugging system may query the operating system for the list of active threads along with their thread IDs. In this manner, the thread IDs are obtained, which are then used for assigning thread names to corresponding threads as applied by the naming convention(s) created via the GUI.

Once the thread names with context identifiers are assigned to any particular thread, the debug ID tool 105 then provides options to assign thread-specific debug parameters to particular threads based on their thread names. This includes applying conditional breakpoint(s) that are triggered by particular threads where the condition of the breakpoint is based on matching one or more context identifiers in a thread name. In this manner, a conditional breakpoint may be assigned to a specific thread or group of threads (e.g., threads that have the same context identifier).

At block 330, the GUI provides options to define a conditional breakpoint during debugging that is thread-specific based on at least one context identifier. In one embodiment, a conditional breakpoint is a type of breakpoint set by a developer in the debugger that suspends the execution of a program or thread, but only when a specified condition is met. This means that the program will pause at the breakpoint location and allow the developer to inspect the program's state and variables only when the condition evaluates to true. If the condition is false, the program will continue executing without interruption.

For example, when adding a conditional breakpoint into a selected line of code, input fields are provided for the user to enter the condition(s) that should trigger the breakpoint.

The condition(s) may include any selected executing state or variable value (e.g., when counter X=10).

The breakpoint condition may include a matching condition based on the thread name or portions of the thread name. The breakpoint condition may specify that the thread name includes (or does not include) a certain context identifier. For example, the condition to enable the breakpoint may be "thread name includes 'Net'." Thus, during debugging, the executing program will stop at the conditional breakpoint only if the assigned thread name includes "Net" somewhere in the string text of the thread name. This configures the breakpoint to be thread-specific, and in this example, thread group-specific because multiple threads may match the context identifier. In this example, the conditional breakpoint would stop threads with names such as:

MyApp1_Net_StartFTP_OA
MyApp1_Net_StartSMTP_OB
MyApp1_Net_StartHTTP_CD
MyApp1_Net_StartHTTP_OB The breakpoint condition may specify a specific thread based on the thread's unique name such as "thread name=MyApp1_Net_StartFTP_OA," which would stop only one particular thread. Thus, the present technique may be used for controlling a conditional breakpoint during debugging that is thread-specific based on a condition including at least one context identifier that matches a portion of the thread name.

In this manner, the conditional breakpoint is configured to be thread-specific based on a thread name or portions of a thread name (e.g., one or more context identifiers). After the conditional breakpoint(s) are set in the code, execution of the code may be resumed to continue the debugging process.

At block 340, in response to an executing thread reaching the conditional breakpoint in the executing code, the debugging system determines whether the breakpoint conditions are met including the thread name conditions (at block 350). In one embodiment, this may include string parsing and string matching functions to determine whether the executing thread name includes the specified context identifier(s) from the conditional breakpoint.

The method moves to block 360 if the thread name meets the breakpoint conditions including any identified context identifiers. The debugging system stops execution of the executing thread in response to the thread name of the executing thread meeting the conditions of the conditional breakpoint. Since the breakpoint conditions include thread name context identifiers, the system determines if the thread name of the executing thread matches/includes the context identifier(s) in the conditional breakpoint.

Upon stopping the execution of the thread, the user may inspect various variables and states, and inspect the call stack, which is a history of function calls leading to the current point of execution. Additionally, the debugger may display the contents of CPU registers, providing insights into the program's state at a low level. The user may also perform other debugging functions, for example, modifying memory or variables to test different scenarios, record the program's execution flow to create a trace log to analyze program behavior, and so on. When debugging is complete at this breakpoint, the user can restart execution of the thread and continue with the debugging process.

Conversely, the method moves to block 370 if the thread name does not match or meet the breakpoint conditions of the context identifiers. Thus, the system allows continued execution of the executing thread in response to the thread name not including at least one context identifier that was configured in the conditional breakpoint. The method continues until the next conditional breakpoint is reached and the process repeats.

Once debugging is complete, the debugger can detach itself from the application or process, allowing it to continue running independently. If the application/process crashes during debugging, the debugger can generate a post-mortem analysis, providing information about the state of the program at the time of the crash.

With the present naming conventions, the debugging system 100 can apply any debug parameter, such as a conditional breakpoint, to a specific thread and/or to a group of threads that share the same context identifiers in their thread names. Similarly, the thread naming process may also be performed for naming different processes in a multi-process system.

Such thread-specific (or process-specific) breakpoints or other thread or process-specific debug parameters were not able to be applied in previous debuggers. Previous debuggers did not provide options to configure a conditional breakpoint on a thread name or a portion of a thread name.

In another embodiment of block 320, the thread naming rule may be configured to define and group a thread family from multiple threads by inserting the same family context identifier into each thread name of threads that belong to the thread family. As previously described, this may include adding the same context identifier such as "Net" or a custom context identifier such as "Family1" to each thread name that belongs to a group of threads. As a result, the conditional breakpoint may be configured to be conditional upon matching the family context identifier so that the breakpoint applies to all threads in the family. Thus, when any executing thread that includes the family context identifier reaches the conditional breakpoint, the breakpoint stops execution of that thread.

Similarly, the naming convention may configure one or more context identifiers to function as a classification identifier. When such a classification identifier is added to a thread name for a set of threads, the set of threads is classified into the same classification. Thus, a user may create and assign (via the debug ID tool GUI) debug parameters that apply to a specific class of threads.

For example, the debug ID tool 105 allows the user to generate a debugging parameter that is configured to apply only to threads that include a certain classification identifier in their associated thread name. This is another form of applying thread-specific debug parameters.

In one embodiment, rules for setting conditional breakpoints on threads may be configured using a thread classification in thread names. This provides additional flexibility and choices to enable conditional breakpoint on threads. For example, rules may be configured to provide the following features:

Enabling the code breakpoint for a whole thread family or a specific component. As the thread name now has context (from the context identifiers), string expressions may be defined as conditions for the breakpoints to enable the breakpoint for a particular thread family or a set of threads based on the condition and the naming convention used.

For example, the GUI allows a user to define and enable a breakpoint for all threads that originate from a particular module in the code (e.g., threads originating from a module called "Database") using a context identifier such as <Originating_Module_identifier>. Based on the naming convention used and where the context identifier was placed in the thread name, options to configure the condition of a breakpoint may include:

(a) Enable breakpoint for Thread names with prefix "Database".

(b) Enable breakpoint for Thread names with suffix "Database".

(c) Enable breakpoint for Thread names containing "Database".

(d) Similar conditions may be defined for a breakpoint with respect to execution time of each thread, the number of times a thread runs, and any inputs or outputs the thread generates by using the thread classifications and naming convention as applied to the thread name.

(e) A breakpoint conditioned on any thread that runs for longer than a certain amount of time, or for any thread that encounters a specific error message.

The above examples may be predefined rules for breakpoints and made available for selection via the GUI of the debugging system 100.

In another embodiment, dynamic automated breakpoints can be set by using machine learning (ML) algorithms to dynamically adjust the breakpoints based on the behavior of the threads during runtime. For example, a reinforcement learning algorithm may be trained to learn which breakpoints are most effective at identifying and diagnosing certain issues. The ML model may then adjust the conditions of a breakpoint accordingly.

Method 300 is not limited to only assigning conditional breakpoints based on thread names or process names. In another embodiment, the debug ID tool 105 is configured to assign a debug pointer to a thread name associated with one thread. Thus, during debugging, the thread name (or a portion of the name) may be displayed over the associated debug pointer to visually identify the debug pointer wherever the thread is executing code. Furthermore, the debug pointers may be displayed with a distinct color that is assigned to the thread name to visually distinguish each thread debug pointer from other debug pointers.

In one embodiment, the GUI of the debug ID tool 105 may include features for managing threads, such as generating a thread list. The debugger's GUI may generate and display a panel or pop-up section that lists all the active threads in the program. Each thread may be represented by its assigned thread name and may display other associated thread properties.

In another embodiment, debugging libraries and APIs may be provided to offer functions for interacting with threads. The debugger can use these APIs to access information about threads based on the assigned thread names. The thread information may include thread IDs, stack traces, and other properties.

Accordingly, the present debug tool provides improved techniques and mechanisms to uniquely and easily identify debug parameters of a process or a thread in a set up where multiple processes are attached to the debugger, or a single process is running multiple threads.

As previously stated, prior debugging models do not have provisions for setting thread-specific or process-specific parameters that would be advantageous to a debugging process.

Cloud or Enterprise Embodiments

In one embodiment, the debugging system 100 is a computing/data processing system including an application or collection of distributed applications for enterprise organizations. The debugging system 100 may be configured to operate with or be implemented as a cloud-based networking system, a software as a service (SaaS) architecture, or other type of networked computing solution. In one embodiment the debugging system 100 is a centralized server-side application that provides at least the functions disclosed herein and that is accessed by many users via computing devices/terminals communicating with the computing system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 4:
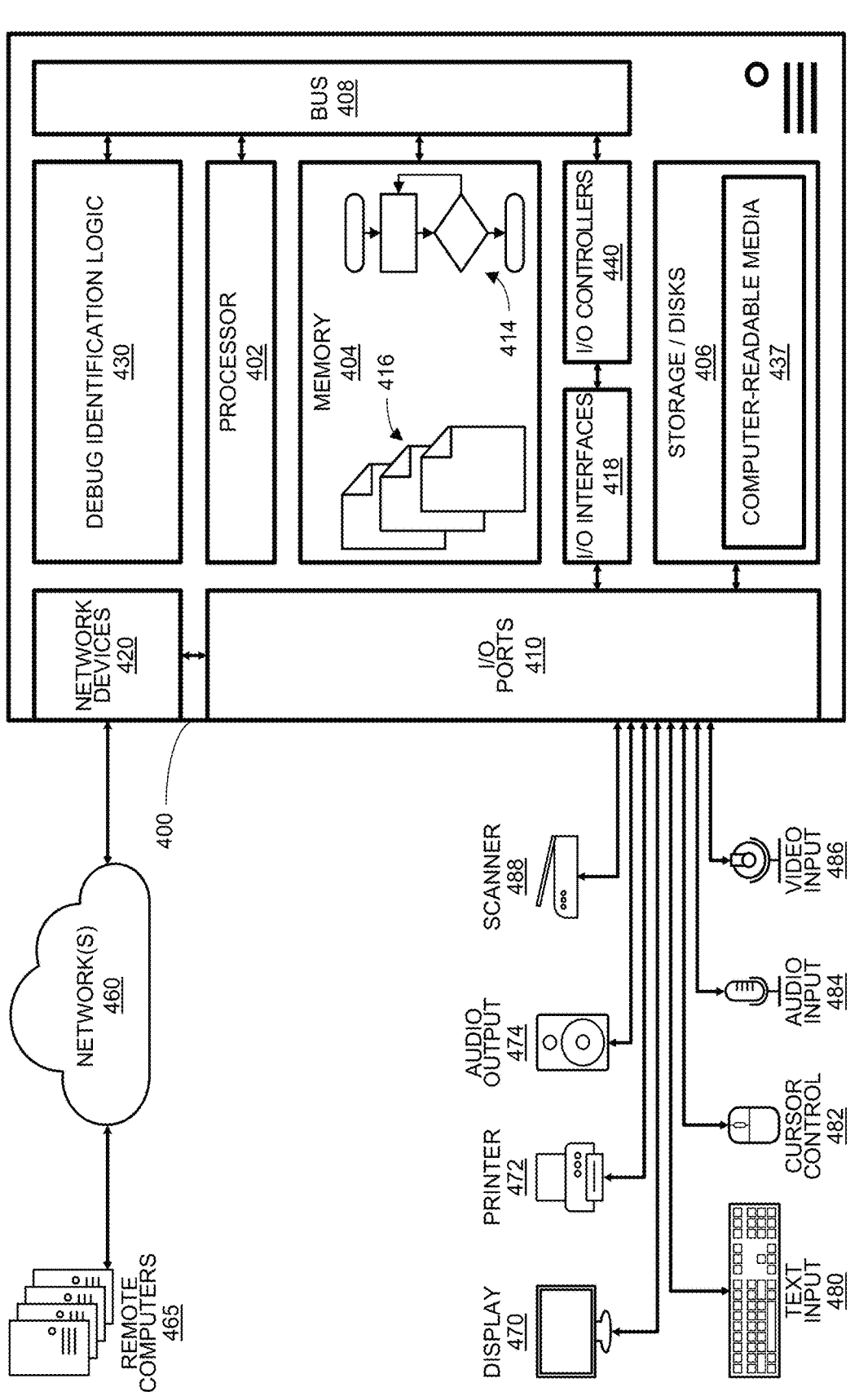
FIG. 4 illustrates an embodiment of a computing system configured with the example systems and/or methods disclosed.

FIG. 4 illustrates an example computing device that is configured and/or programmed as a special purpose computing device with one or more of the example systems and methods described herein, and/or equivalents. The example computing device may be a computer 400 that includes at least one hardware processor 402, a memory 404, and input/output ports 410 operably connected by a bus 408. In one example, the computer 400 may include debug ID logic 430 configured to facilitate a configurable identification mechanism of debug parameters in multi-process and/or multi-threaded debugging of code similar to features of the debugging system 100 and debug ID tool 105 shown in FIGS. 1, 2, and 3.

In different examples, the logic 430 may be implemented in hardware, a non-transitory computer-readable medium 437 with stored instructions, firmware, and/or combinations thereof. While the logic 430 is illustrated as a hardware component attached to the bus 408, it is to be appreciated that in other embodiments, the logic 430 could be implemented in the processor 402, stored in memory 404, or stored in disk 406.

In one embodiment, logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to implement the features of debug ID tool 105. The means may also be implemented as stored computer executable instructions that are presented to computer 400 as data 416 that are temporarily stored in memory 404 and then executed by processor 402.

Logic 430 may also provide means (e.g., hardware, non-transitory computer-readable medium that stores executable instructions, firmware) for performing one or more of the disclosed functions and/or combinations of the functions.

Generally describing an example configuration of the computer 400, the processor 402 may be a variety of various processors including dual microprocessor and other multiprocessor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 400 via, for example, an input/output (I/O) interface (e.g., card, device) 418 and an input/output port 410 that are controlled by at least an input/output (I/O) controller 440. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The computer 400 may interact with, control, and/or be controlled by input/output (I/O) devices via the input/output (I/O) controller 440, the I/O interfaces 418, and the input/output ports 410. Input/output devices may include, for example, one or more displays 470, printers 472 (such as inkjet, laser, or 3D printers), audio output devices 474 (such as speakers or headphones), text input devices 480 (such as keyboards), cursor control devices 482 for pointing and selection inputs (such as mice, trackballs, touch screens, joysticks, pointing sticks, electronic styluses, electronic pen tablets), audio input devices 484 (such as microphones or external audio players), video input devices 486 (such as video and still cameras, or external video players), image scanners 488, video cards (not shown), disks 406, network devices 420, and so on. The input/output ports 410 may include, for example, serial ports, parallel ports, and USB ports.

The computer 400 can operate in a network environment and thus may be connected to the network devices 420 via the I/O interfaces 418, and/or the I/O ports 410. Through the network devices 420, the computer 400 may interact with a network 460. Through the network, the computer 400 may be logically connected to remote computers 465. Networks with which the computer 400 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored executable computer instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology.

Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, the method comprising:

generating a graphical user interface (GUI) for a debugging program, where the GUI is configured to provide options to configure naming rules for threads during debugging of a computer process that includes multiple threads;

for a target thread, configuring a naming rule to generate a thread name by:

displaying a plurality of available context identifiers that are selectable on the GUI;

receiving a selection of one or more context identifiers from the plurality of available context identifiers; and generating the thread name for the target thread including the one or more context identifiers from the selection that form a unique thread name;

generating the thread name for the target thread by automatically populating the one or more context identifiers in the thread name with a variable value that occurs during execution of the target thread that corresponds to the one or more context identifiers; and controlling a conditional breakpoint during the debugging that is thread-specific based on a condition including at least one context identifier that matches a portion of the thread name.

2. The method of claim 1, wherein the method further comprises: in response to an executing thread reaching the conditional breakpoint:

(i) stopping execution of the executing thread in response to the thread name of the executing thread matching the condition including the at least one context identifier; and (ii) allowing continued execution of the executing thread in response to the thread name not matching the condition including the at least one context identifier.

3. The method of claim 1, wherein generating the thread name includes:

generating the thread name of the target thread including a string of the one or more context identifiers from the selection that are combined together to form the unique thread name.

4. The method of claim 1, wherein the context identifiers include a classification identifier that when added to a thread name of a set of threads, classify the set of threads into the same classification; and generating a debugging parameter that is configured to apply only to threads that include the classification identifier in an associated thread name.

5. The method of claim 1, further comprising:

assigning a debug pointer to a thread name associated with one thread from the multiple threads; and during the debugging, displaying the thread name over the associated debug pointer along with a distinct color that is visually different from other debug pointers.

6. The method of claim 1, further comprising:

in response to a first thread being stopped at a breakpoint during debugging, assigning a unique thread name to the first thread based on at least the one or more context identifiers applied by the naming rule; and visually identifying thread debug parameters that are associated with the first thread based on the unique thread name of the first thread.

7. A non-transitory computer-readable medium that includes stored thereon computer-executable instructions that when executed by at least a processor of a computer cause the computer to:

generate, by at least the processor, a graphical user interface (GUI) for a debugging program, where the GUI is configured to provide options to configure naming rules for threads during debugging of a computer process that includes multiple threads;

wherein the GUI is configured to provide the options to configure a naming rule for a target thread by:

displaying a plurality of available context identifiers that are selectable on the GUI;

receiving a selection of one or more context identifiers
from the plurality of available context identifiers; and generating the thread name for the target thread including
a string of the one or more context identifiers from the
selection that form a unique thread name;

apply the naming rule to create the thread name for the
target thread;

provide options to define a conditional breakpoint during
the debugging of the computer process that is thread-
specific based on at least one breakpoint context iden-
tifier;

in response to an executing thread reaching the condi-
tional breakpoint during debugging of the computer
process:

(i) stop execution of the executing thread in response to
the thread name of the executing thread including a
context identifier that matches the at least one break-
point context identifier; and (ii) allow continued execution of the executing thread
in response to the thread name not including the at
least one breakpoint context identifier.

8. The non-transitory computer-readable medium of claim
7, wherein the naming rule adds the one or more context
identifiers that are selected to the thread name of the target
thread.

9. The non-transitory computer-readable medium of claim
7, further comprising instructions that when executed by at
least the processor cause the processor to:

define a family context identifier and group a set of
threads as a thread family from the multiple threads by
inserting the family context identifier into each thread
name of the set of threads that belong to the thread
family; and configure the conditional breakpoint to be conditional
upon matching the family context identifier to stop
execution of all threads in the thread family.

10. The non-transitory computer-readable medium of
claim 7, further comprising instructions that when executed
by at least the processor cause the processor to:

wherein the GUI allows one or more context identifiers to
function as a classification identifier that when added to
a thread name of a set of threads from the multiple
threads, classify the set of threads into a specific
classification; and generate a thread-specific debugging parameter that is
configured to apply only to threads classified in the
specific classification based on an associated thread
name including the classification identifier.

11. The non-transitory computer-readable medium of
claim 7, further comprising instructions that when executed
by at least the processor cause the processor to:

assign a debug pointer to a thread name associated with
one thread from the multiple threads; and during the debugging, display the thread name over the
associated debug pointer along with a distinct color that
is visually different from other debug pointers.

12. The non-transitory computer-readable medium of
claim 7, further comprising instructions that when executed
by at least the processor cause the processor to:

in response to a first thread being stopped at a breakpoint
during debugging, assign a unique thread name to the
first thread based on at least the one or more context
identifiers applied by the naming rule; and visually identity thread debug parameters that are asso-
ciated with the first thread based on the unique thread
name of the first thread.

13. The non-transitory computer-readable medium of
claim 7, further comprising instructions that when executed
by at least the processor cause the processor to:

generate the thread name by automatically populating one
or more of the context identifiers with a context or
variable value that occurs during execution of the
thread that corresponds to the one or more context
identifiers.

14. A computing system, comprising:

at least one processor connected to at least one memory;

a non-transitory computer readable medium including
instructions stored thereon that when executed by at
least the processor cause the processor to:

generate, by at least the processor, a graphical user
interface (GUI) for a debugging program, where the
GUI is configured to provide options to configure
naming rules for threads during debugging of a com-
puter process that includes multiple threads;

wherein the options to configure the naming rules include
configuring a naming rule that adds one or more
context identifiers to a target thread name by:

displaying a plurality of available context identifiers that
are selectable on the GUI;

receiving a selection of one or more context identifiers
from the plurality of available context identifiers; and generating a thread name for the target thread including a
string of the one or more context identifiers from the
selection that form a unique thread name;

provide options to define a conditional breakpoint during
the debugging that is thread-specific based on a con-
dition including at least one context identifier;

in response to an executing thread reaching the condi-
tional breakpoint:

(i) stop execution of the executing thread in response to
the thread name of the executing thread matching the
condition including the at least one context identi-
fier; and (ii) allow continued execution of the executing thread
in response to the thread name not matching the
condition including the at least one context identifier.

15. The computing system of claim 14, wherein the
instructions further include instructions that when executed
by at least the processor cause the processor to:

generate the thread name of the target thread by adding
the string of the one or more context identifiers from the
selection including context identifer 1 to context iden-
tifier N that form the unique thread name.

16. The computing system of claim 14, further configured
to:

define a family context identifier and group a set of
threads as a thread family from the multiple threads by
inserting the family context identifer into each thread
name of the set of threads that belong to the thread
family; and configure the conditional breakpoint to be conditional
upon matching the family context identifier to stop
execution of all threads in the thread family.

17. The computing system of claim 14, wherein the GUI
allows one or more context identifiers to function as a
classification identifier that when added to a thread name of
a set of threads from the multiple threads, classify the set of
threads into a specific classification; and wherein the computing system is further configured to
generate a thread-specific debugging parameter that is
configured to apply only to threads classified in the
specific classification based on an associated thread
name including the classification identifier.

18. The computing system of claim 14, further configured to:

assign a debug pointer to a thread name associated with one thread from the multiple threads; and during the debugging, display the thread name over the associated debug pointer along with a distinct color that is visually different from other debug pointers.

19. The computing system of claim 14, further configured to:

in response to a first thread being stopped at a breakpoint during debugging, assign a unique thread name to the first thread based on at least the one or more context identifiers applied by the naming rule; and visually identity thread debug parameters that are associated with the first thread based on the unique thread name of the first thread.

20. The computing system of claim 14, further configured to:

generate the thread name by automatically populating one or more of the context identifiers with a context or variable value that occurs during execution of the thread that corresponds to the one or more context identifiers.

\* \* \* \* \*